V. DE MARAIS.
FIREARM.
APPLICATION FILED MAY 24, 1912.
1,055,147.
Patented Mar. 4, 1913.
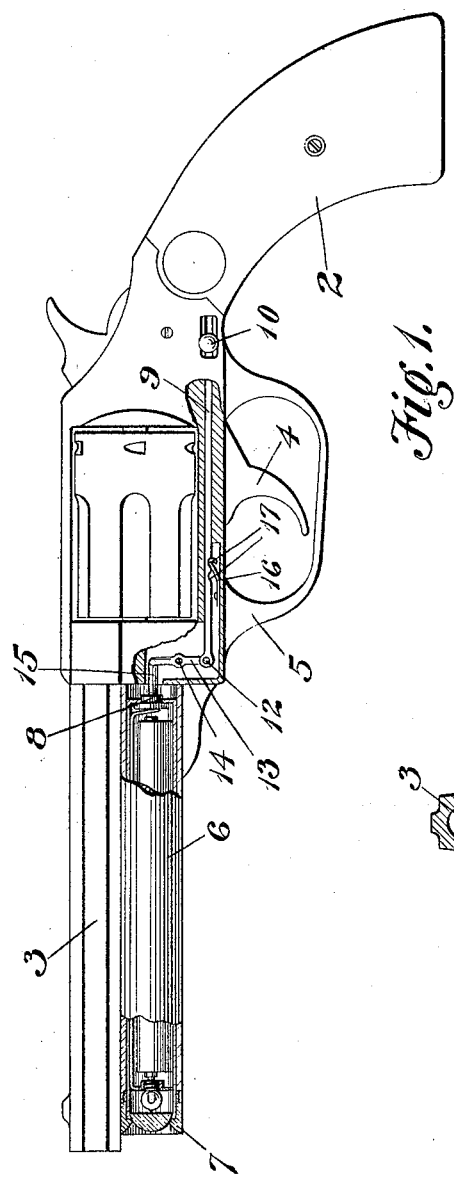
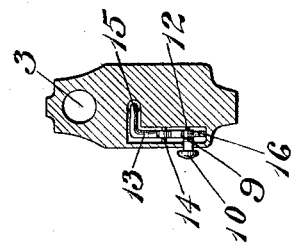
Inventor
Victor De Marais
By Victor J. Evans
Attorney
Witnesses

UNITED STATES PATENT OFFICE.

VICTOR DE MARAIS, OF OROVILLE, CALIFORNIA, ASSIGNOR OF ONE-HALF TO GEORGE E. GARDNER, OF OROVILLE, CALIFORNIA.

FIREARM.

1,055,147.      Specification of Letters Patent.      Patented Mar. 4, 1913.

Application filed May 24, 1912. Serial No. 699,500.

*To all whom it may concern:*

Be it known that I, VICTOR DE MARAIS, a citizen of the United States, residing at Oroville, in the county of Butte and State of California, have invented new and useful Improvements in Firearms, of which the following is a specification.

This invention relates to fire-arms, the object in view being to provide a search light or target illuminating device for use in connection with fire-arms, said device being adapted to be carried by and to form a part of the fire-arm, and to be thrown into and out of use as found expedient, thereby economizing in the consumption of the electrical energy generated by the battery or its equivalent forming a part of the apparatus.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation, showing the device applied to a revolver, the latter being partly broken away. Fig. 2 is a sectional view of the apparatus.

In illustrating the embodiment of this invention, I have shown an ordinary revolver, comprising the frame 1, handle 2, and barrel 3, trigger 4 and trigger guard 5.

In carrying out the present invention, I provide an extra barrel or container 6, resembling in shape and size the main barrel of the fire-arm, and provided at its outer end with a removable screw cap 7, in order to give access to the interior of the container to insert and remove the battery, lamp, etc., and repair the circuit closer 8 shown mounted in the rear end thereof.

The operating mechanism for the circuit closer 8 consists of a slidable push rod 9 mounted within the frame of the fire-arm, as shown in Fig. 1, and provided adjacent to its rear end with a laterally projecting knob 10 adapted to be worked by the thumb or finger of the operator while grasping the handle 2 of the fire-arm, so that by pushing said knob 10 forward or backward, the rod 9 may be correspondingly moved.

The forward end of the rod 9 is pivotally connected at 12 to the lever 13, the latter being fulcrumed, at 14, within the frame of the fire-arm. The upper portion of this lever is bent at a right angle, as shown at 15, and lies in close proximity to or in actual contact with the circuit closer 8. In order to hold the push rod 9 at either limit of its movement, I provide a spring detent 16 secured in any convenient manner to the frame of the fire-arm and adapted at one end to snap into either of a pair of notches 17 formed in one of the faces of the push rod 9.

From the foregoing description, it will be seen that by pushing the knob 10 forward and backward, movement is imparted through the rod 9 to the lever 13, the end of which is adapted to push inward on the circuit closer 8 and thereby close the circuit and generate a light in the lamp or bulb arranged in the forward end portion of the container barrel 6. As this barrel points in the same direction as the main barrel 3 of the fire-arm, the rays of light will be projected to the point and upon the object covered by the main barrel 3. This especially adapts the device for use at night time, and will be particularly desirable for officers and men in the army and navy, enabling target practice to be carried on at night time as well as during the day.

The device will also be found particularly useful and convenient to police departments.

What is claimed is:

The combination with a firearm, of a barrel-shaped container extending parallel to the main barrel and bearing a fixed relation thereto, an electric battery and lamp within said container, a circuit closer within the rear end of said container, a slidable finger operated push rod housed within the frame of the firearm and provided with a finger knob located adjacent to the hand grip of the firearm and projecting laterally from the frame, a lever housed within the frame and coöperating with said rod and circuit closer, and a spring engaging notches in said rod and serving to retain the latter at either limit of its movement.

In testimony whereof I affix my signature in presence of two witnesses.

VICTOR DE MARAIS.

Witnesses:
W. C. SMITH,
C. W. McLENNAN.

Copies of this patent may be obtained for five cents each, by addressing the "Commissioner of Patents, Washington, D. C."